United States Patent [19]
Phillips et al.

[11] Patent Number: 5,855,762
[45] Date of Patent: Jan. 5, 1999

[54] OXYGEN GENERATING DEVICE

[75] Inventors: Robert John Phillips, Eeniton; Ralph Gordon William Taylor, Cullompton, both of Great Britain

[73] Assignee: Normalair-Garrett (Holdings) Limited, Somerset, United Kingdom

[21] Appl. No.: 726,984

[22] Filed: Oct. 7, 1996

[30] Foreign Application Priority Data

Oct. 7, 1995 [GB] United Kingdom .................. 9520554

[51] Int. Cl.$^6$ ............. C25B 1/02; C01B 13/10; C01B 13/02; B03C 3/68

[52] U.S. Cl. ............. 205/634; 205/626; 205/633; 204/176; 42/186.15; 42/186.16; 96/18; 96/19; 95/19

[58] Field of Search ............. 422/186.07, 186.28; 7/186.15, 186.16, 186.2; 204/176; 205/626, 633, 634; 96/4, 18, 19; 55/210; 128/205.27; 95/54, 19

[56] References Cited

U.S. PATENT DOCUMENTS 5,061,296  10/1991  Sengpiel et al. ................. 95/7
5,441,610   8/1995  Renlund et al. ................. 204/129
5,643,355   7/1997  Philips et al. ................... 96/4

*Primary Examiner*—Robert J. Warden
*Assistant Examiner*—Alex Noguerola
*Attorney, Agent, or Firm*—Marshall, O'Toole, Gerstein, Murray & Borun

[57] ABSTRACT

A method of controlling an oxygen generation device of the kind including a ceramic membrane through which an electrical current is passed whilst ambient air is supplied to one side of the membrane, the membrane allowing oxygen in the supplied air to diffuse therethrough by ionic transport when the membrane is at or above an operating temperature, at a rate dependant upon the electrical current, there being a plenum or the like to recover the oxygen at a second side of the membrane, the method comprising regulating the electrical current passing through the membrane by switching the electrical current on and off and varying the proportion of current-on time in a given time interval (t) in dependence upon a feedback signal.

12 Claims, 3 Drawing Sheets

OXYGEN GENERATING DEVICE

BACKGROUND TO THE INVENTION

This invention relates to a method of controlling an oxygen generating device and to an oxygen generating device.

In order for passengers or aircrew in an aircraft to breath when exposed to ambient atmospheric pressure at elevated altitudes, it is necessary to provide a supply of breathing gas enriched with oxygen.

One means of achieving this is to carry within the airframe a supply of compressed oxygen gas, but particularly in a small aircraft, where space is at a premium, and/or in an aircraft where the added weight of the gas bottle containing the compressed oxygen gas is significant, this is not acceptable.

To reduce weight and space requirements another means is to carry within the airframe liquid oxygen. Liquid oxygen systems give rise to space and weight penalties and also a requirement for liquid oxygen to be available for replenishment of the liquid oxygen supply at a ground station.

More recently oxygen-enriched gas has been produced on-board of the aircraft by a so-called on-board oxygen generating system (OBOGS) based on pressure swing technology using a zeolite molecular sieve material to separate oxygen from air. This requires at least two zeolite beds which have to be sequentially cycled through on-stream/generating and off-stream/purge cycles. A limitation of such systems is that theoretically the maximum oxygen concentration obtainable in the product gas is 95% unless additional means are provided for the removal of argon and other trace gases from the supply air which is normally bleed air from a compressor stage of an engine powering the aircraft.

Increasing attention is now being given to ceramic membrane technology in provision of a system which will generate substantially 100% oxygen product gas or highly oxygen-enriched product gas of breathable quality for use in aerospace and other breathing applications. Such gas will hereinafter be referred to as being "oxygen rich", and the residual gas, will be referred to as being "oxygen depleted".

Certain ceramic materials (for example Yttria doped Zirconia or Gaddia doped Ceria), which are so-called ionic conductors of oxygen, become electrically conductive at elevated temperatures due to the mobility of oxygen ions within the crystal lattice. Since these materials are only conductive to oxygen ions in the presence of an electrical current, an external electric circuit is needed. It is necessary to control the electrical current supply in order to regulate the production of oxygen required.

Such an oxygen generation device comprises a membrane of such material to one side of which is supplied ambient air. Oxygen diffuses through the membrane by ionic transport and is recoverable from a second, other, side of the membrane for use. Oxygen production rate is dependent on the electrical current supply to the membrane.

DESCRIPTION OF THE PRIOR ART

A conventional method of controlling the electrical supply is so called proportional control, whereby the magnitude of electrical current provided to the membrane is dependent upon a feedback signal for example, indicative of the amount of oxygen which has been produced by the generator and is available for use.

However particularly in aerospace use, there is a requirement for the oxygen generating device ideally to be small and light. The power consumed by a oxygen generating device which utilises ceramic membrane technology, is substantial, and hence the control equipment necessary to control the magnitude of the electrical current, also is necessarily substantial.

SUMMARY OF THE INVENTION

According to a first aspect of the invention we provide a method of controlling an oxygen generating device of the kind including a ceramic membrane through which an electrical current is passed whilst ambient air is supplied to one side of the membrane, the membrane allowing oxygen in the supplied air to diffuse therethrough by ionic transport when the membrane is one of at and above an operating temperature, at a rate dependent upon the electrical current, there being means to recover the oxygen at a second side of the membrane, the method comprising regulating the electrical current passing through the membrane by switching the electrical current on and off and varying the proportion of current-on time in a given time interval, in dependence upon a feedback signal.

This method of regulating the electrical current provides significant advantages over conventional proportional control methods. Particularly, the control equipment necessary to regulate the electrical current can be significantly simplified compared with the equipment necessary to achieve proportional control. Also, the method of the invention has been found to be more efficient, enabling higher power densities in the ceramic membrane to be achieved.

Preferably, the feedback signal utilised in the method is indicative of the amount of oxygen which has been produced by the generator and is available for use. For example, the means to recover the oxygen at the other side of the membrane may include a plenum to which the oxygen is fed, and the feedback signal may provide a measure of the oxygen pressure in the plenum, which in turn will give a measure of the amount of oxygen production required. Thus where oxygen demand increases, the pressure of oxygen within the plenum will reduce, and this will result in the electrical current being regulated so that the proportion of current-on time in a given time interval, passing through the ceramic membrane, is increased, thus to increase oxygen production and increase the pressure of oxygen in the plenum.

Preferably the feedback signal is compared with a reference which is indicative of a desired oxygen storage level e.g. pressure, to produce a control signal which is operative to vary the proportion of current-on time in a given time interval. In a preferred arrangement, the amount of ambient air supplied to the one side of the membrane is also controlled. Thus the method may include supplying the ambient air to the one side of the membrane e.g. by means of a fan, and varying the supply, e.g. by varying the speed of the fan, in dependence upon a feedback signal, which may be the same feedback signal utilised in the method of the invention for regulating the electrical current passing through the membrane.

Preferably the fan is electrically powered and the speed of the fan is varied by switching the electrical current to the fan on and off and varying the proportion of current-on time in a given time interval in dependence upon the feedback signal.

The feedback signal for controlling the fan, may be indicative of the amount of oxygen which has been produced by the generator and is available for use, or may be otherwise derived e.g. from the membrane temperature.

According to a second aspect of the invention we provide an oxygen generation device of the kind including a ceramic membrane through which an electrical current is passed whilst ambient air is fed to one side of the membrane, the membrane allowing oxygen in the supplied air to diffuse therethrough by ionic transport when the membrane is at or above an operating temperature, at a rate dependant upon the electrical current, there being means to recover the oxygen at a second side of the membrane, and control means to regulate the electrical current passing through the membrane by switching the electrical current on and off and varying the proportion of current-on time in a given time interval in dependence upon a feedback signal.

The means to recover oxygen at the other side of the membrane may include a plenum to which the oxygen is fed, and there may be a transducer to measure the oxygen pressure in the plenum and to provide the feedback signal to the control means.

Thus the control means may include a comparator means to compare the feedback signal with a reference which is indicative of a desired oxygen storage level, to produce a control signal which is operative to vary the proportion of current-on time in a given time interval.

The device may include an electrically powered fan means to supply the ambient air to the one face of the membrane, and the control means may vary the speed of the fan by switching the electrical current to the fan on and off and varying the proportion of current-on time in a given time interval in dependence upon a feedback signal.

The feedback signal utilised by the control means to vary the speed of the fan may be the same feedback signal that is used by the control means to vary the electrical current to pass through the membrane, or another feedback signal.

Typically temperatures in the order of 600K are required to obtain sufficient ionic conductivity.

BRIEF DESCRIPTION OF THE DRAWINGS

The invention will now be described with reference to the accompanying drawings in which.

DESCRIPTION OF THE PREFERRED EMBODIMENTS

Figure 1:
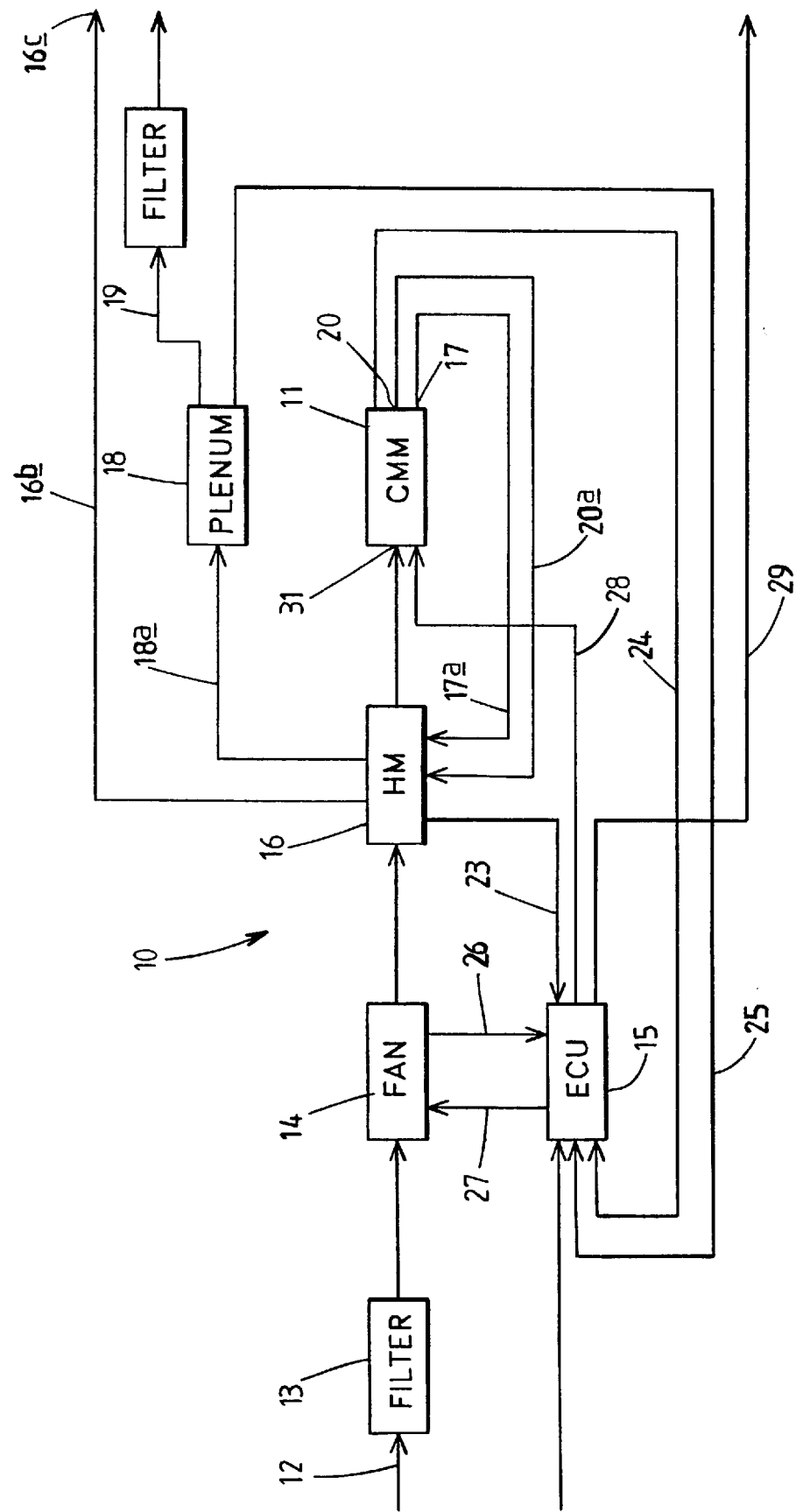
FIG. 1 is a diagrammatic illustration of an oxygen generating system incorporating an oxygen generating device in accordance with the invention.

Referring to FIG. 1, there is shown an oxygen generating system 10, which has at its heart, a ceramic membrane module 11 being an oxygen generating device operated by a method in accordance with the invention.

A gas mixture such as for example ambient air from an un-compressed compartment of an aircraft, enters the system through an inlet 12, where any debris entrained in the inlet 12 may be filtered from the ambient air by a filter 13. The air is drawn into the inlet 12 and is fed through the remainder of the system via a fan 14, the speed of which is controlled by an electrical control unit 15 as hereinafter described.

The ambient air, which may be at a very cool temperature indeed, possibly below 273K, then passes through a heater module 16 which will be described in more detail hereinafter, where, at least after the system 10 has warmed up, the ambient air will be pre-heated before the air passes into the ceramic membrane module 11.

The ceramic membrane module 11 generates oxygen rich gas component as hereinafter described, which passes from the module 11 via an outlet 17. The oxygen rich gas component passes through the heater module 16 via line 17a where at least some of its heat is dissipated to the ambient air, so that a cooled oxygen rich gas supply is obtained, which is fed via line 18a to a plenum 18, where the oxygen gas component may pass to, for example, an aircrew via a filter 19 where the oxygen rich air component can be breathed, particularly at ambient atmospheric pressure at elevated altitudes.

The volume of the plenum 18 may be as required, but generally is of a small volume being the equivalent to perhaps, the volume of line 18a from the heater module 16 to the filter 19.

The ceramic membrane module 11 also produces a supply of hot oxygen depleted gas component which passes from the module via an outlet 20. The hot oxygen depleted air component is also fed to the heater module 16, along a line 20a, where at least some of its heat is dissipated to the ambient air passing through the heater module 16. The cooled oxygen depleted gas component then passes from the heater module 16 via line 16b and is disposed of, for example through an external port 16c of the aircraft.

It will be appreciated that the ceramic membrane module 11 can only operate to separate the ambient air into its oxygen rich and oxygen depleted air components, when at a temperature above a minimum operating temperature; typical operating temperatures are in the range 800–1200K.

Thus the heater module 16 may also comprise an electrical resistance or some other kind of auxiliary heater so that at least during an initial warm up period, the ambient air entering the heater module 16 can be warmed so that warmed air is fed to the ceramic membrane module 11 rather than cold air.

Thus heating may be effected in the heater module 16 in addition to the heating effect of the hot oxygen rich and oxygen depleted gas components which are passed therethrough. In another arrangement, the ceramic membrane module 11 may include an integral heating means such as is described in our co-pending European application published under number 0726226.

The temperature of the ambient air within the heater module 16, and/or the temperature of the oxygen rich and/or oxygen depleted gas component fed to the heater module 16, is monitored, so as to provide a suitable input via line 23 to the electronic control unit 15. Also, the temperature within the ceramic membrane module 11 may be monitored, so as to provide an input 24 to the electronic control unit 15 to protect the ceramic membrane module 11 from overheating.

The pressure of the oxygen rich gas component supply in plenum 18 is also monitored, e.g. by a pressure transducer which provides an input 25 to the electronic control unit 15. The speed of the fan 14, and hence the volume of air being delivered to the heater module 16 and subsequently to the ceramic membrane module 11, is also monitored and an input 26 is provided to the electronic control unit 15.

In response to demand for oxygen rich gas component, as indicated by the input 25, the electronic control unit 15 controls the speed of the fan 14 via a line 27, and the power fed to the ceramic membrane module 11 via a line 28 to control the level of oxygen generation in the ceramic membrane module 11. There is also a built in test which results in an output indicated at 29 for example, to alert an aircrew to the fact that the system 10 is not operating correctly.

The ceramic membrane module 11 may comprise a membrane of, ceramic material through which electrical current is passed, the material being active when at an elevated temperature above a minimum operating temperature to cause separation of air or other gas into oxygen rich and oxygen depleted gas components. In a practical arrangement, a stack of such membranes would be provided.

One suitable active ceramic material consists of an electrolyte such as Cerium Gadolinium Oxide (CGO) coated on both sides with an electrode made for example of Lanthanum Strontium Cobalt Ferrite (LSCF).

The amount of oxygen rich gas component generated can be adjusted by regulating the electrical current which passes through the ceramic membrane module 11. One method of achieving this would be to change the voltage across and hence the current passing through the module 11. This is so called "proportional control".

Figure 4:
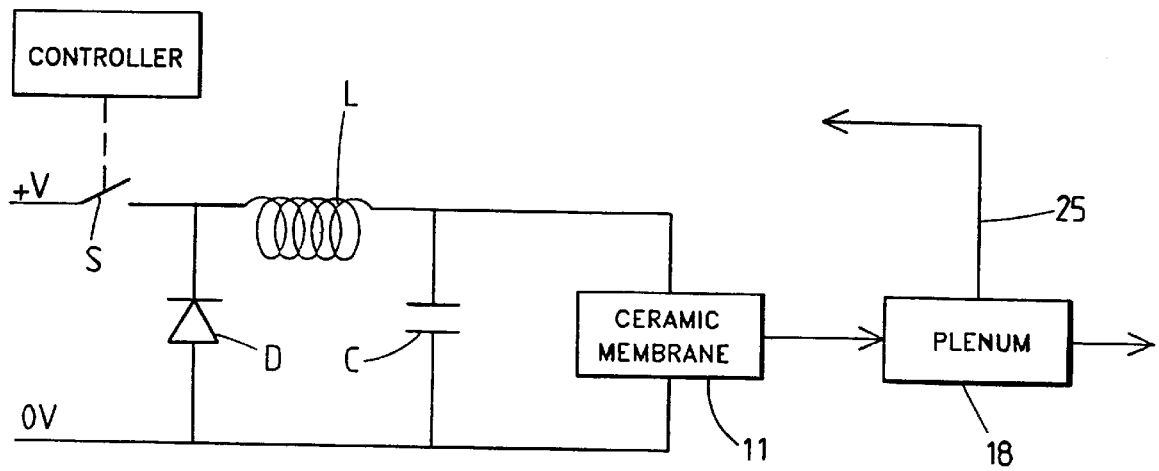
FIG. 4 is a view similar to FIG. 2 but of a prior art method.

An example of a typical proportional control which could be applied to the system 10 is indicated in FIG. 4. It can be seen that the magnitude of the electrical current is varied in dependence upon the input 25 from the pressure transducer sensing the pressure of oxygen in the plenum 18. This may be achieved by means of a comparator which compares the input 25 with a reference indicative of the amount of oxygen required in the plenum 18. The difference between these two signals is thus used by the controller proportionally to regulate the flow of electrical current through the ceramic membrane module 11. In this example, a continuous D.C. current is supplied to the module 11 via an inductance L, a capacitor C and a diode D which, together with a switch S, form a conventional switched mode power supply.

When switch S is moved to a closed position, energy is stored in the inductor L and current is supplied directly to the module 11.

When switch S is moved to an open position, energy stored within the inductor L is recovered to power the load of the module 11. Capacitor C serves to provide short term energy storage to power the load of the module 11 during switch transitions, and in conjunction with the conductor L smooths the voltage applied across the module 11.

The actual load voltage is proportional to the duty cycle of the switch S which is controlled by the controller. In this manner current is supplied continuously to the module 11.

It will be appreciated that such switched mode power supply technology consumes high power.

Also, it will be appreciated that the power required by the ceramic membrane module 11 is substantial, and thus the inductor/capacitor/diode and other components of the proportional control circuit would also need to be substantial, resulting in significant weight penalty.

Figure 2:
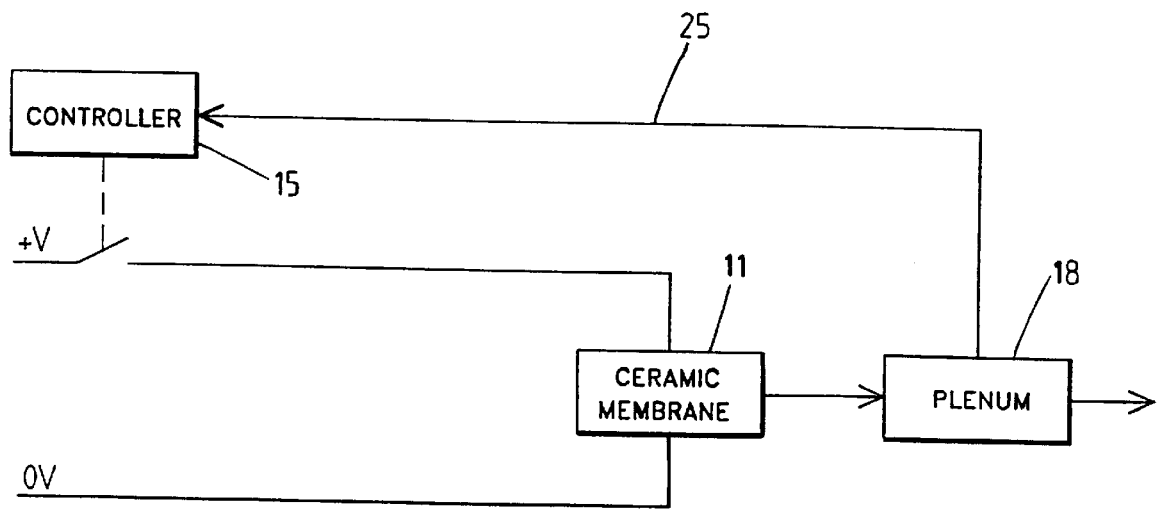
FIG. 2 is a diagrammatic illustrative view of part of the oxygen generating system of FIG. 1.

An arrangement in accordance with the invention is shown in FIG. 2 which regulates the electrical current supplied to the ceramic membrane module 11 by switching the current on and off. By varying the proportion of current-on time in a given time interval, in dependence upon a feedback signal i.e., input 25 from the pressure transducer in the plenum 18, the production of oxygen in the ceramic membrane module 11 is thus controlled.

Figure 3:
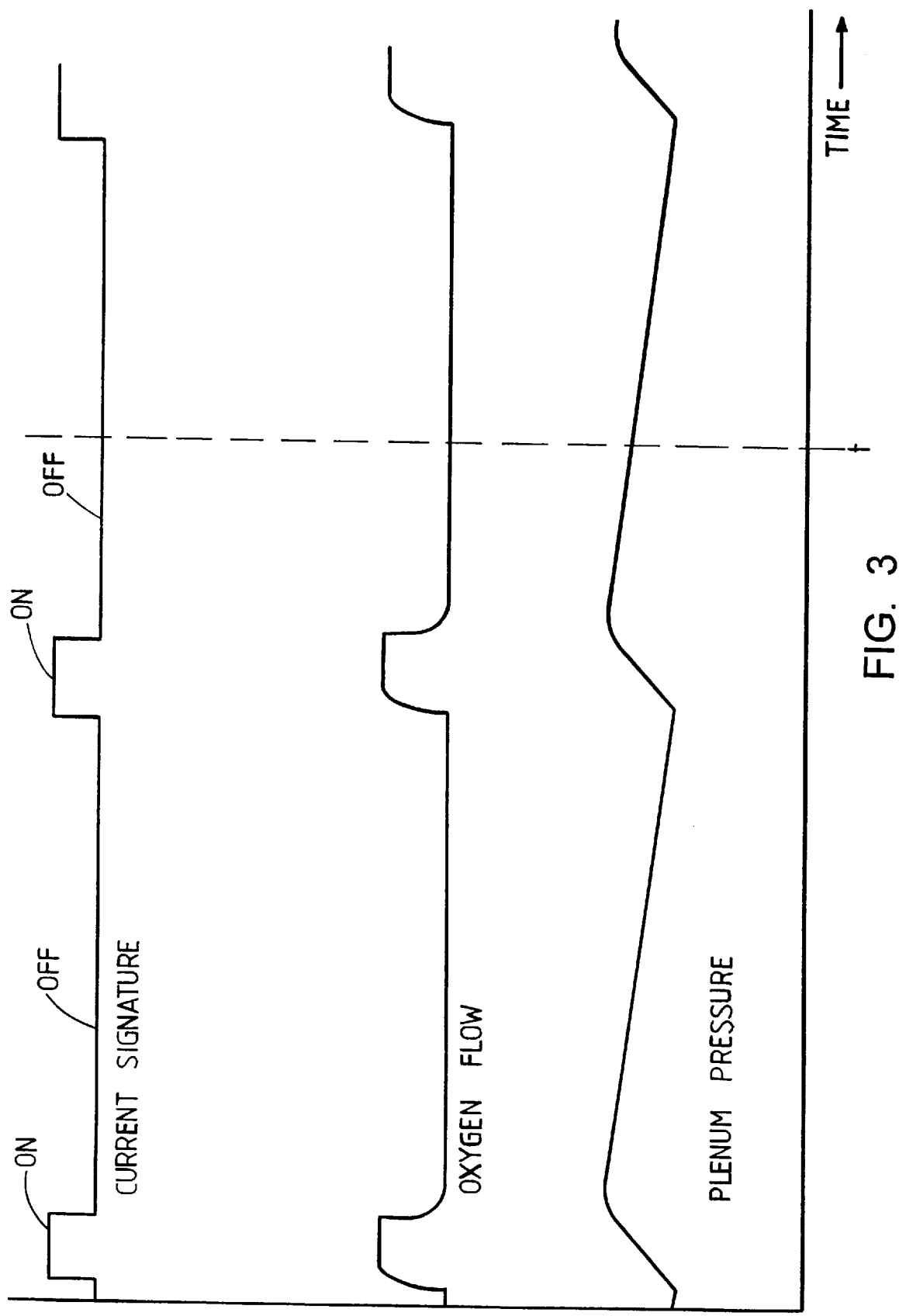
FIG. 3 is a graph showing the relationship between electrical current, oxygen production and plenum pressure in a method in accordance with the invention.

Referring also to FIG. 3, it will be appreciated that in any given time interval, the current may be switched on any desired number of times, for example twice in the arrangement shown in FIG. 4 in that given time interval t, and that the proportion of current-on time indicated may be varied, by varying the so called mark-space ratio of the current signal.

The ceramic membrane module 11 will respond as indicated in FIG. 3 by generating oxygen in response to current-on times. Thus by changing the current-on time in a given time interval t, the amount of oxygen generated will too, be varied. FIG. 3 also indicates how the plenum pressure would be expected to change, for a steady demand for oxygen rich gas component, utilising the current characteristic indicated in the Figure.

If demand increases, the input 25 to the electronic control unit 15 will indicate that greater oxygen production is required as pressure in the plenum 18 will fall. The electronic control unit 15 is arranged to increase the proportion of current-on time in a given time interval, in response, either/or by increasing the frequency of switching, and/or by adjusting the mark-space ratio and to achieve this, may compare in a comparatocomparator means the input 25 with a reference which is indicative of a desired oxygen storage level in plenum 18, to produce a control signal which is operative to vary the proportion of current on time in a given time interval.

Preferably, the fan 14, which is electrically powered, is also controlled by means of varying speed of the fan in dependence upon the signal input 25 from the plenum 18. Preferably the electronic control unit 15 switches the electrical current to the fan 14 on and off and/or varies the proportion of current on time in a given time interval in dependence upon the input 25, in a similar manner to that in which the electronic control unit 15 regulates the electrical current passing through the membranes of the ceramic membrane module 11.

The temperature within the ceramic membrane module 11 is controlled by means of monitoring the temperature and adjusting the amount of ambient air fed to the ceramic membrane module 11. In order to reduce the temperature the speed of the fan 14 is increased, thus increasing the amount of cooling airflow. In order to increase the temperature the fan speed is reduced. The speed of the fan 14 may be controlled by varying the proportion of current on time in a given time interval.

Various modifications may be made without departing from the scope of the invention. For example, the arrangement of the oxygen generating system shown in FIG. 1 is only an example of a typical system which may utilise the invention. The particular arrangement shown in FIG. 2 is only diagrammatic and it will be appreciated that in practice, the circuit may be more complex than indicated. In any event, the circuit would require less bulky and heavy components than that required by a conventional proportional control circuit such as described in FIG. 4, and as the electrical characteristics of the power supply and the module 11 can be closely matched, the invention permits more efficient use of the power available from the power supply.

Although in the arrangement described, the speed of fan 14 is determined with reference to the input 25 from the plenum 18, it will be appreciated that the speed of fan 14 may be regulated in dependence upon a feedback signal only derived from the temperature of the ceramic membrane module 11 and/or the temperature of oxygen rich gas components generated therein or the oxygen depleted air.

We claim:

1. In a method of controlling an oxygen generation device including the steps of providing a ceramic membrane through which an electrical current is passed while ambient air is supplied to one side of the membrane, the membrane allowing oxygen in the supplied air to diffuse therethrough by ionic transport when the membrane is at or above an operating temperature, at a rate dependent upon the electrical current, and recovering the oxygen at a second side of the membrane, the improvement comprising regulating the electrical current passing through the membrane by switching the electrical current on and off and varying the proportion of current-on time in a given time interval in dependence upon a feedback signal.

2. A method according to claim 1 wherein the feedback signal is indicative of the amount of oxygen which has been produced by the generator and is available for use.

3. A method according to claim 2 wherein the recovery of oxygen at the second side of the membrane includes providing a plenum to which the oxygen is fed, the feedback signal providing a measure of the oxygen pressure in the plenum.

4. A method according to claim 2 wherein the feedback signal is compared with a reference which is indicative of a desired oxygen storage level, to produce a control signal which varies the proportion of current-on time in a given time interval.

5. A method according to claim 1 which includes controlling the amount of ambient air supplied to the one side of the membrane by varying the supply in dependence upon a feedback signal.

6. A method according to claim 5 wherein the controlling of the ambient air supply comprises providing a fan which is electrically powered and the speed of the fan is varied by switching the electrical current to the fan on and off and varying the proportion of current-on time in a given time interval in dependence upon the feedback signal.

7. A method according to claim 6 wherein the feedback signal is indicative of the amount of oxygen which has been produced by the generator and is available for use.

8. An oxygen generation system having a device comprising a ceramic membrane through which an electrical current is passed while ambient air is supplied to one side of the membrane, the membrane allowing oxygen in the supplied air to diffuse therethrough by ionic transport when the membrane is one of at and above an operating temperature, at a rate dependent upon the electrical current, means to recover the oxygen at a second side of the membrane, and the system including control means to regulate the electrical current passing through the membrane by switching the electrical current on and off and varying the proportion of current-on time in a given time interval in dependence upon a feedback signal.

9. A system according to claim 8 wherein the means to recover oxygen at the second side of the membrane includes a plenum to which the oxygen is fed, and a transducer to measure the oxygen pressure in the plenum and to provide the feedback signal to the control means.

10. A system according to claim 8 wherein the control means includes a comparator means to compare the feedback signal with a reference which is indicative of a desired oxygen storage level, to produce a control signal which varies the proportion of current-on time in a given time interval.

11. A system according to claim 8 which includes an electrically powered fan means provided to supply the ambient air to the one side of the membrane, the control means varying the speed of the fan by switching the electrical current to the fan on and off and varying the proportion of current-on time in a given time interval in dependence upon a feedback signal.

12. A system according to claim 11 wherein the feedback signal utilised by the control means to vary the speed of the fan is the same feedback signal that is used by the control means to vary the electrical current passed through the membrane.

* * * * *